April 22, 1958
R. W. BERGMAN ET AL
2,831,209
APPARATUS FOR SLITTING BOVINE INTESTINES
Filed May 24, 1956
2 Sheets-Sheet 1
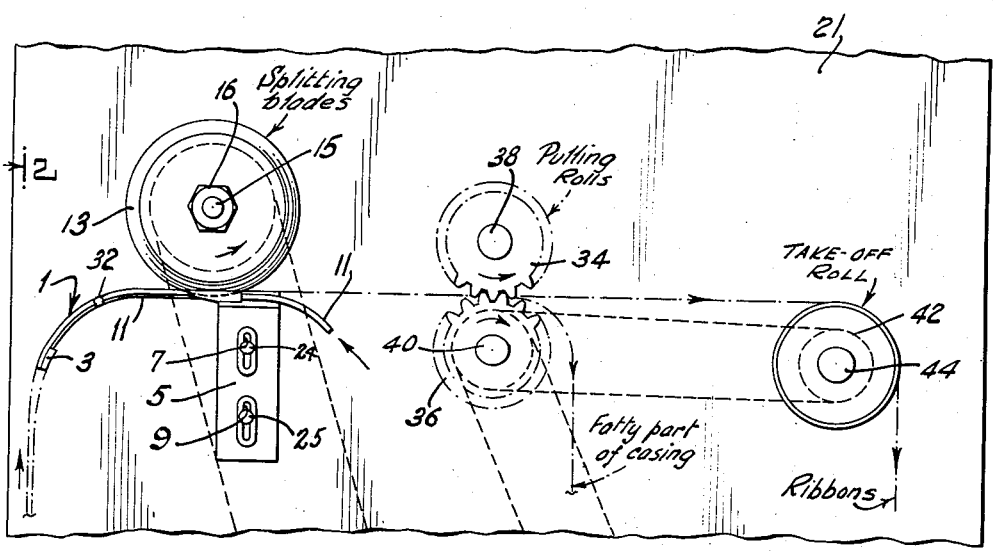
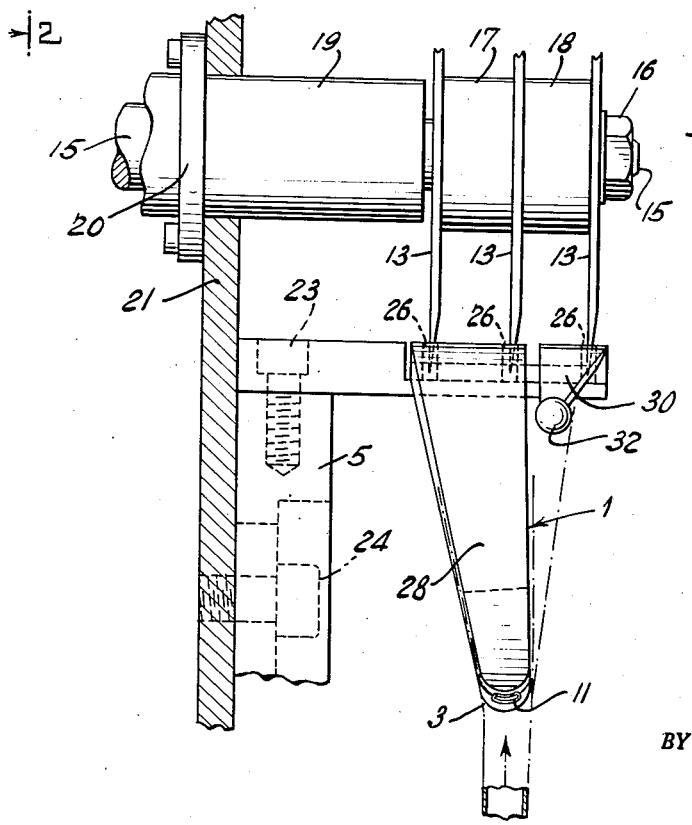
INVENTORS:
WILLIAM F. LODDING
RAYMOND W. BERGMAN
BY Leroy F. Halley
ATTORNEY April 22, 1958 R. W. BERGMAN ET AL 2,831,209
APPARATUS FOR SLITTING BOVINE INTESTINES
Filed May 24, 1956 2 Sheets-Sheet 2
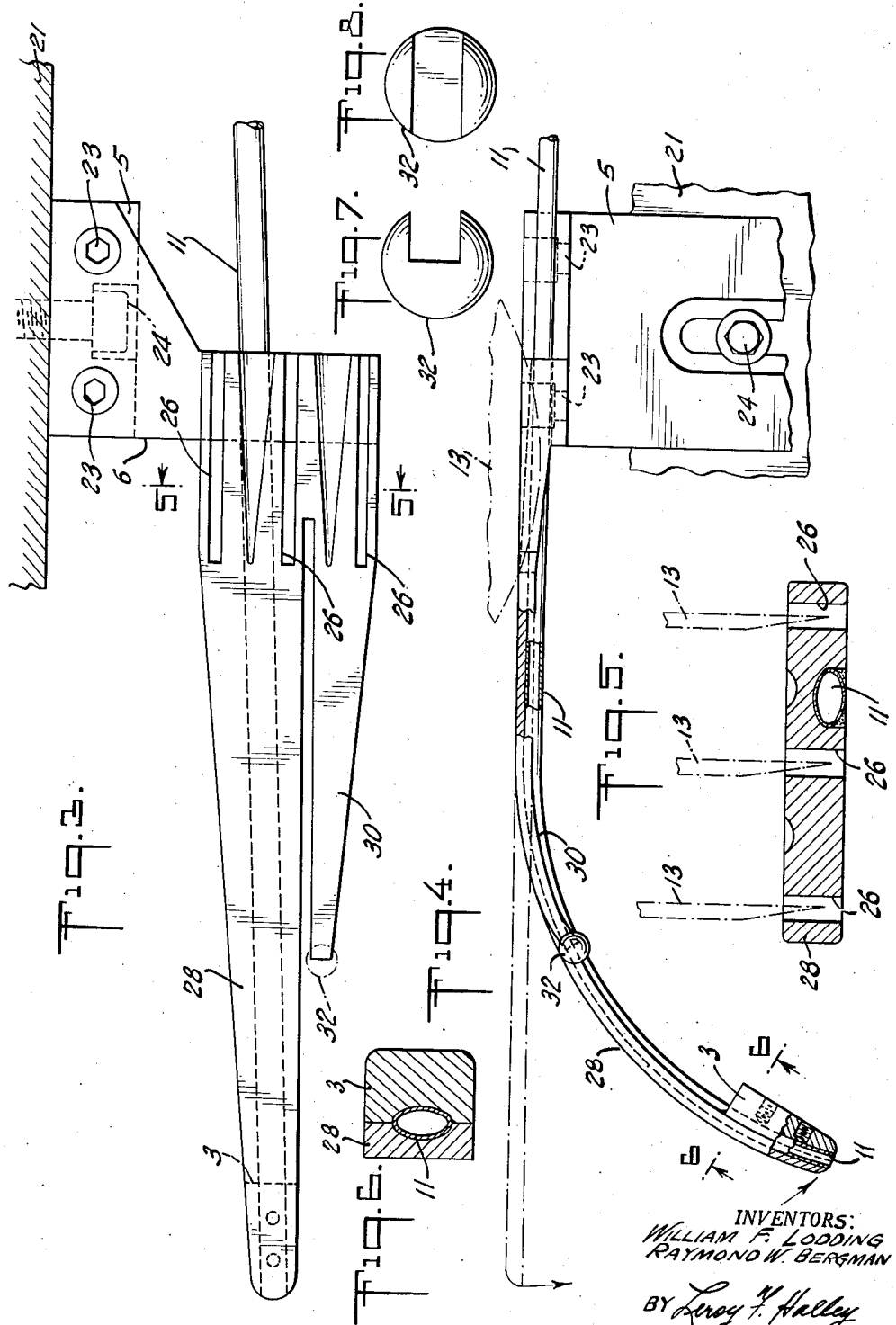
INVENTORS:
WILLIAM F. LODDING
RAYMOND W. BERGMAN
BY Leroy F. Halley
ATTORNEY

2,831,209

APPARATUS FOR SLITTING BOVINE INTESTINES

Raymond Walter Bergman, Joliet, and William Frederick Lodding, Chicago, Ill., assignors to Ethicon, Inc., a corporation of New Jersey Application May 24, 1956, Serial No. 587,009

2 Claims. (Cl. 17—43)

This invention relates to means for the treatment and manipulation of bovine intestines and particularly to means adapted for slitting bovine intestines longitudinally to provide ribbons for use in the manufacture of strings for tennis rackets and surgical sutures and ligatures.

At the present time catgut for use in the manufacture of surgical sutures and ligatures is primarily made from the submucosal layer of the sheep intestine. Two ribbons are obtained by the longitudinal slitting of a washed and cleaned casing. The ribbons are scraped to remove the mucosa and in the course of the scraping operation the serosal and muscularis tissue layers as well as the mesentery are removed. The submucosal tissue layer of collagen is subjected to additional processing steps to remove any adhering noncollagenous tissue and particularly any adhering muscularis tissue. Strands are made by twisting one ribbon or combining and twisting two or more ribbons. Strands which are to be used as sutures and ligatures are cut into appropriate lengths, sterilized, and sealed in glass tubes with a tubing fluid. It is in this form that catgut sutures and ligatures are supplied to the medical profession. Catgut for use in the manufacture of tennis strings and sutures and ligatures has also been prepared from the serosal tissue layer of beef intestines and from the submucosal tissue layer of sheep intestines.

In a method heretofore used in preparing strings from bovine intestines which are suitable for use as tennis strings and sutures and ligatures, the serosal tissue layer was separated from the submucosal tissue layer of a beef intestine and simultaneously cut into two or more strips by using a specially designed splitting peg, such as that described in U. S. Patent No. 2,720,678, October 18, 1955. Other methods practiced heretofore for obtaining strips of serosal tissue layer of bovine intestines have required the use of complicated machinery, and have particularly included the step of conditioning the bovine intestines by a crushing operation to weaken the muscularis tissue layer which acts to bond together the serosal tissue layer and the submucosal tissue layer. Because the serosal and submucosal tissue layers are so firmly held together by the muscularis tissue layer, breakage of intestines was frequent even when a preconditioning operation was employed.

The serosal tissue layer of a bovine intestine is particularly well suited for use in the manufacture of tennis strings and surgical sutures and ligatures. The part of the intestine opposite the mesentery, which is known as the "smooth side," is the preferred part of the intestine and one or two strips of suitable width may be obtained from each "smooth side." In the method to which the present invention relates, the "smooth side" of a bovine intestine is slit longitudinally by cutting through the serosal, muscularis and submucosal tissue layers to provide one or two strips and the serosal tissue layer is then separated from the muscularis and submucosal tissue layers by mechanical means.

The device of this invention is in the nature of a splitting peg which is designed to cut one or two ribbons from the "smooth side" of a bovine intestine. Two ribbons are obtained from a larger and one ribbon from a smaller intestine. The device removes two ribbons as long as the casing is of sufficient size and automatically removes one ribbon if the diameter of the intestine is too small to provide two ribbons.

The apparatus of this invention will now be described with reference to the drawings in which:

Figure 1 is a schematic view of a machine suitable for use in slitting ribbons from the "smooth side" of a bovine intestine which shows the slitting peg and particularly shows the relation of the slitting peg to slitting blades, pulling and take-off rolls;

Figure 2 is an enlarged end view fragmentary and partly in section along the line 2—2 of Figure 1 taken in the direction of the arrows, showing the positional relationship between the slitting peg and the slitting blades;

Figure 3 is a top plan view partly in section of the slitting peg before it is bent in the form of a curve;

Figure 4 is a side view with parts broken away and with parts in section showing the curvature of the slitting peg and the relation of the lubricating tube to the slitting peg body and enlarged tip;

Figure 5 is a view in section along the line 5—5 of Figure 3 taken in the direction of the arrows, showing the relation of the lubricating tube and slitting blades to the slitting peg;

Figure 6 is an enlarged view in section of the tip of the slitting peg along the line 6—6 of Figure 5 taken in the direction of the arrows;

Figures 7 and 8 are an enlarged top view and an enlarged end view, respectively, of the tip of the casing expanding arm of the slitting peg.

In order to describe with particularity the device of this invention over which a bovine intestine is drawn to provide one or more intestinal strips, the various features of the device and its modifications are described in detail below with reference to the drawings in which like numbers refer to like parts.

The structural details of the slitting peg are shown in Figures 3 to 8 inclusive. The positional relation of the slitting peg to slitting blades, pulling and take-off rolls is shown in Figures 1 and 2.

Referring to Figures 3 and 5, main arm 28 and expanding arm 30 of the slitting peg are shown in Figure 3 prior to being bent in the form of a curve. As shown in Figure 4, the main arm and expanding arm are bent so that they have a curvature which conforms substantially to the natural curvature of a bovine intestine. The expanding arm is positioned adjacent to and is shorter than the main arm and the two arms form a wedge having an apex at their front ends. The slitting peg is formed from one piece of metal or rigid plastic. The main arm has a tip piece 3 positioned at the front end and the expanding arm has a spherical tip 32 positioned at the front end. A lubricating tube 11 extends the length of the slitting peg and through the tip piece. The relation of the lubricating tube to the tip piece and slitting peg body is particularly illustrated in Figures 5 and 6. Figure 5 illustrates the position of slitting blades 13 in the blade clearance slots 26. The base 5 of the slitting peg is attached to a frame plate 21 by means of a screw 24. Screws 23 hold the side extension of the slitting peg to the frame side plate.

Figures 7 and 8 show a tip 32 in spherical form and adapted to fit over the end of the casing expanding arm.

Figure 4 shows the curvature of the main arm and expanding arm of the slitting peg and the relative lengths of the two arms. The position of a slitting blade is also illustrated in Figure 4.

Referring to Figures 1 and 2 in which the slitting peg is indicated generally at 1, the slitting peg is shown mounted on base 5, the base being attached to frame side plate 21 by means of screws 24 and 25 which pass through slots 7 and 9. Screws 23 hold side extension 6 to the slitting peg base. A tube 11 is fastened to the under side of the slitting peg and through tip piece 3. Slitting blades 13 are mounted on a drive shaft 15 and held in place by lock nut 16. The slitting blades are separated by spacers 17 and 18 and drive shaft bearing housing 19 separates the blades from the frame side plate. The drive shaft is held to the frame side plate by means of mounting bracket 20. A motor, not shown, is connected to the drive shaft and the cutting edges of the rotating blades are set in blade clearance slots 26. Upper and lower toothed pulling rolls 34 and 36, which are positioned to the rear of the slitting blades, are mounted on shafts 38 and 40, respectively. Take-off roll 42, which is positioned to the rear of the pulling rolls, is mounted on shaft 44. The pulling and take-off roll shafts are mounted on the frame side plate by conventional means not shown. The lower pulling roll is belt or chain driven by a source of power, not shown, and the take-off roll is belt or chain driven from the lower pulling roll.

Referring again to Figures 1 and 2, an operator pulls the larger end of a bovine intestine over the tip piece of the slitting peg and over the main arm of the spherical tip of the casing expanding arm, water being passed through the tube to lubricate the casing as it is pulled over the peg. The intestine passes under the rotating slitting blades and the under side of the intestine, referred to in Figure 1 as the fatty part of the intestine, and the ribbons are passed between the pulling rolls which are preferably toothed as shown in Figure 1. The pulling rolls exert a continuous, uniform and positive pressure on the ribbons and fatty part of the intestine and pull the intestine over the slitting peg throughout its entire length. The fatty part of the casing is allowed to fall by gravity into a receiving tub, not shown, after passing between the pulling rolls, and the ribbons are passed over the takeoff roll and collected in a receiving receptacle, not shown. As long as the intestine has a diameter of sufficient size so that it can pass over both the main and expanding arms of the slitting peg, two strips of intestine are obtained. If the diameter of the intestine decreases so that it is not of sufficient size to pass over both arms of the slitting peg a break occurs at a point on the outside surface of the expanding arm and the intestine then passes over the main arm of the slitting peg only and one strip of intestine is obtained.

There is considerable variation in the diameter of the bovine intestines, depending upon the portion of the intestine and the age of the animal. In general, the width of the base of the slitting peg is such that the largest size bovine intestine may be readily drawn thereover and is taut but is not stretched to any substantial degree. The width of the base of the main arm of the slitting peg is such that when a bovine intestine of the smallest size is drawn over it the intestine is taut but is not stretched to any substantial degree.

The tissue layers of the strips removed from the "smooth side" of a bovine intestine by means of the slitting peg may readily be separated by mechanical means in which the serosal tissue layer is pulled away from the muscularis tissue layer and submucosal tissue layer. The serosal tissue layer obtained in this manner may be scraped to remove any adhering traces of muscularis tissue layer. One or more strips of serosal tissue layer are twisted to form a strand which is dried and polished to uniform diameter. The strands so obtained are suitable for use as tennis strings and may also be sterilized and hermetically sealed in glass tubes with an aqueous alcohol solution, in which form they are ready for use as surgical sutures and ligatures.

A slitting peg and the method and apparatus by which it is used has been particularly described with respect to its use in the removal of one or two strips from a bovine intestine, and the invention directed to the slitting peg has been described with particular reference to specific embodiments; accordingly, it is to be understood that the invention is not to be limited to its specific aspects and details but is to be construed broadly and restricted solely by the scope of the appended claims.

What is claimed is:

1. A device for slitting and removing at least one but not more than two ribbons from the "smooth side" of a bovine intestine comprising in combination a slitting peg having a main arm and an adjacent and shorter expanding arm, the arms being in the same plane, curved to conform to the curvature of a bovine intestine, integrally joined to a triple-slotted base at the rear ends thereof and forming together a wedge having an apex at the front ends thereof; and three rotary slitting blades positioned in the slots of the peg base.

2. A bovine intestine slitting peg for removing at least one but not more than two ribbons from the "smooth side" of a bovine intestine comprising a main arm and an adjacent and shorter expanding arm in the same plane, curved to conform to the curvature of a bovine intestine, integrally joined to a base at the rear ends thereof and forming together a wedge having an apex at the front ends thereof.

References Cited in the file of this patent

UNITED STATES PATENTS

| 691,505 | Turner | Jan. 21, 1902 |
| 1,523,465 | Villemer | Jan. 20, 1925 |
| 2,720,678 | Valentine et al. | Oct. 18, 1955 |